United States Patent [19]

Siniscal

[11] 4,193,489
[45] Mar. 18, 1980

[54] EXIT CONVEYOR SYSTEM FOR NEWSPAPER MAIL ROOM

[75] Inventor: Paul Siniscal, Hollis, N.H.

[73] Assignee: Rockwell International Corporation, Pittsburgh, Pa.

[21] Appl. No.: 851,452

[22] Filed: Nov. 14, 1977

[51] Int. Cl.$^2$ .............................................. B65G 47/24
[52] U.S. Cl. .................................. 198/406; 198/415; 198/461; 198/534
[58] Field of Search .............. 198/415, 623, 461, 462, 198/404, 529, 534, 536, 525, 633, 374, 527, 526, 787, 365, 406; 193/35 A, 32, 40; 414/757, 774

[56] References Cited

U.S. PATENT DOCUMENTS

| | | | |
|---|---|---|---|
| 2,055,053 | 9/1936 | Stokes | 198/787 |
| 2,767,666 | 10/1956 | Rhodes | 198/415 |
| 3,312,320 | 4/1967 | Froio | 193/35 A |
| 3,603,446 | 9/1971 | Maxey | 198/415 X |
| 3,977,513 | 8/1976 | Rushforth | 198/365 |

FOREIGN PATENT DOCUMENTS

| | | | |
|---|---|---|---|
| 965353 | 5/1957 | Fed. Rep. of Germany | 193/40 |
| 1141224 | 12/1962 | Fed. Rep. of Germany | 193/32 |

*Primary Examiner*—Robert B. Reeves
*Assistant Examiner*—Douglas D. Watts

[57] ABSTRACT

For a newspaper mail room having a closed-loop track and an endless cart train whose carts are adapted to carry a pair of newspaper bundles for delivery to the exit end of the system, an exit conveyor system is provided which includes a first bundle-spacing section comprising a power-driven roller conveyor disposed parallel to the cart-train track and having drag means for effecting desired spacing between individual bundles, followed by a second bundle-turning section comprising a power-driven off-center belt conveyor parallel to the cart-train track for applying forward pull to the undersurface of only a portion of a received bundle for rotating the bundle about its vertical axis into an angular orientation for delivery into the 90° bend of a gravity exit chute which extends at right angles to the cart-train track. A bundle speed-control device is provided near the bottom of the exit chute comprising retardation gate means for slowing down the bundle and delivering it at desired speed to a transverse discharge belt conveyor located at the base of the exit chute. The bundle carried by the discharge conveyor encounters a turning post which rotates the bundle through 90° into the desired orientation for discharge to the loading dock or truck.

5 Claims, 11 Drawing Figures

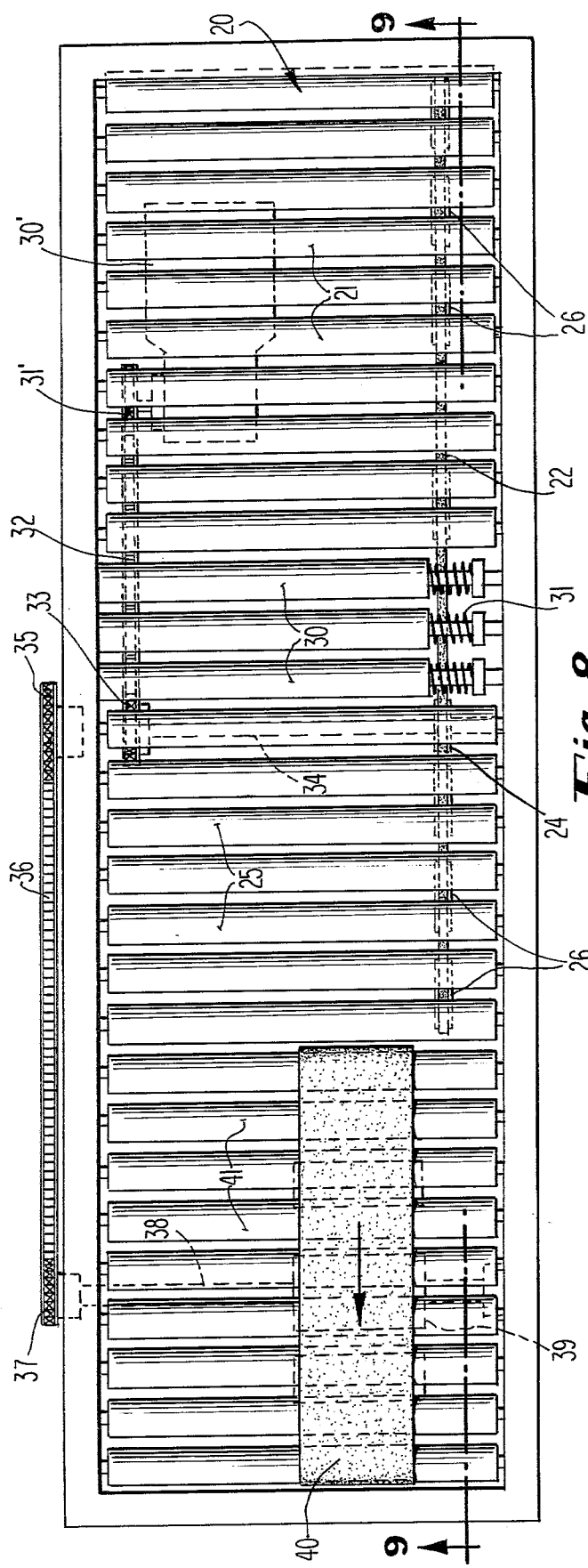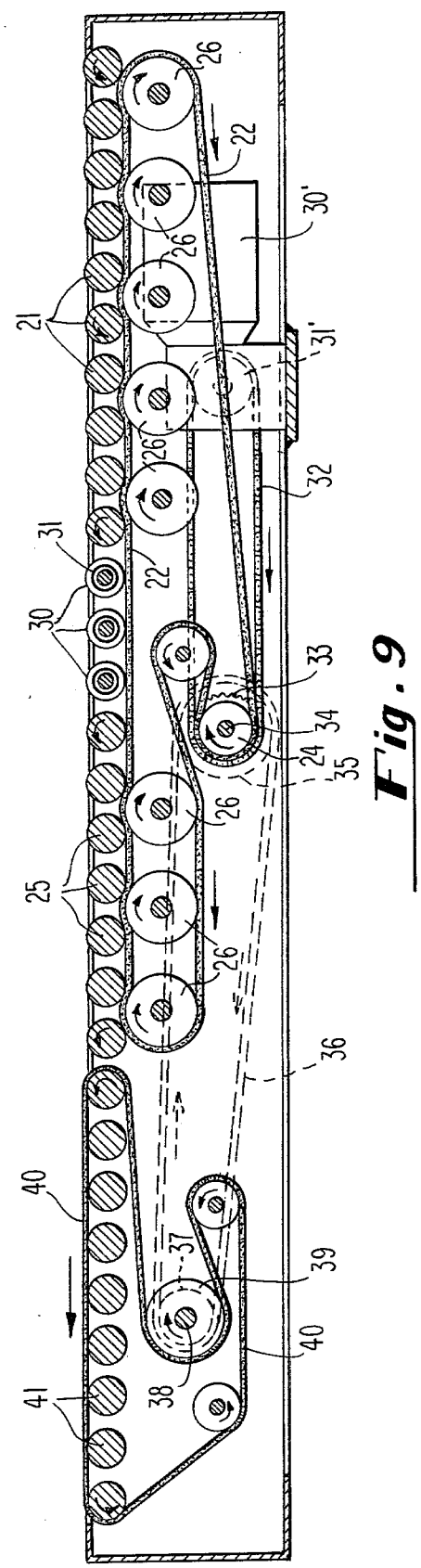

EXIT CONVEYOR SYSTEM FOR NEWSPAPER MAIL ROOM

BACKGROUND OF THE INVENTION

This invention relates to a newspaper "mail room." The "mail room" is a term used by those in the art to refer to the area in a newspaper publishing system having automatic equipment for transporting, counting, stacking, wrapping, tying, and carting newspapers in bottom-wrapped tied stacked bundles to the discharge conveyors for delivery to the trucks at the loading docks.

In a known form of newspaper mail room, newly printed and assembled newspapers are conveyed transported by an overhead stream conveyor successively to one or more stackers which function to count the newspapers and stack them in stacks of a preselected number to form stacks of a desired height. The stacker discharges the stacks of newspapers onto one or more conveyors which carry the stacks to wrappers which apply a bottom wrap to the stacks. The bottom-wrapped stacks are then carried to tying devices which tie the bundles. The tied bundles are then loaded in pairs onto one of the carts of an endless train of carts moving along a closed-loop track. There may, in a typical case, be several hundred carts in the train and the train may move about 250 feet per minute. The bundles on the cart are positioned in side by side relationship with the longer dimension, i.e., the headline edges, of the newspapers transverse to the longitudinal axis of the cart. Thus, the shorter edges of the newspaper bundles face the sidewall or gate of the cart.

As the cart track approaches the exit position, the cart track is tilted from horizontal to an angular position 30° from the horizontal. In tilted position, the bundles are stopped by the side gate of the cart from sliding off the cart under gravity forces. Upon arriving at the exit position, a cam at the side of the track lowers the side gate of the cart and the bundles slide off the tilted cart onto an exit conveyor.

U.S. Pat. No. 3,977,513 issued Aug. 31, 1976 to George T. Rushforth, and assigned by mesne assignments to the assignees of the present application, describes a newspaper mail room system of the foregoing type. The Rushforth patent describes an endless track on which an endless cart-train rides; it describes bundles of newspapers pushed in pairs onto empty moving carts of the cart-train; it describes the cart track and carts tilted at an angle of the order of 30° as the cart approaches the exit position; it describes the cart gate cam opened at a proper instant to allow the pairs of bundles on the tilted cart to slide off onto an exit conveyor adjacent and parallel to the cart track; and it describes the bundles delivered from the exit conveyor into the 90° bend of an exit chute.

SUMMARY OF THE INVENTION

A principal object of the present invention is to provide improvements in an exit system for use in a newspaper mail room system of a type such as is disclosed in Rushforth U.S. Pat. No. 3,977,513, or similar system.

A more specific object is to provide improved means for providing desired spacing between the individual bundles as they are moved toward the loading docks.

Another object is to provide means for turning the individual bundle about its own vertical axis into an angular orientation best suited for sending the bundle into a 90° bend at the upper end of a gravity exit chute so that the bundle has a desired orientation as it slides down the gravity exit chute.

Another object is to provide bundle speed-control means at the lower end of the gravity exit chute for slowing down the speed of the bundle and giving it a desired speed so that it will be deposited in proper position on a discharge belt conveyor which is moving at right angles to the exit chute. When deposited in proper position, the bundle will engage a cornering post and be rotated 90° to a desired orientation for delivery to the loading dock or truck.

BRIEF DESCRIPTION OF THE DRAWINGS

FIG. 8 is a top plan view of the bundle-spacing and bundle-turning sections of the exit system.

FIG. 9 is a side elevational view looking along the line 9—9 of FIG. 8.

DETAILED DESCRIPTION OF THE PREFERRED EMBODIMENTS

Figure 1:
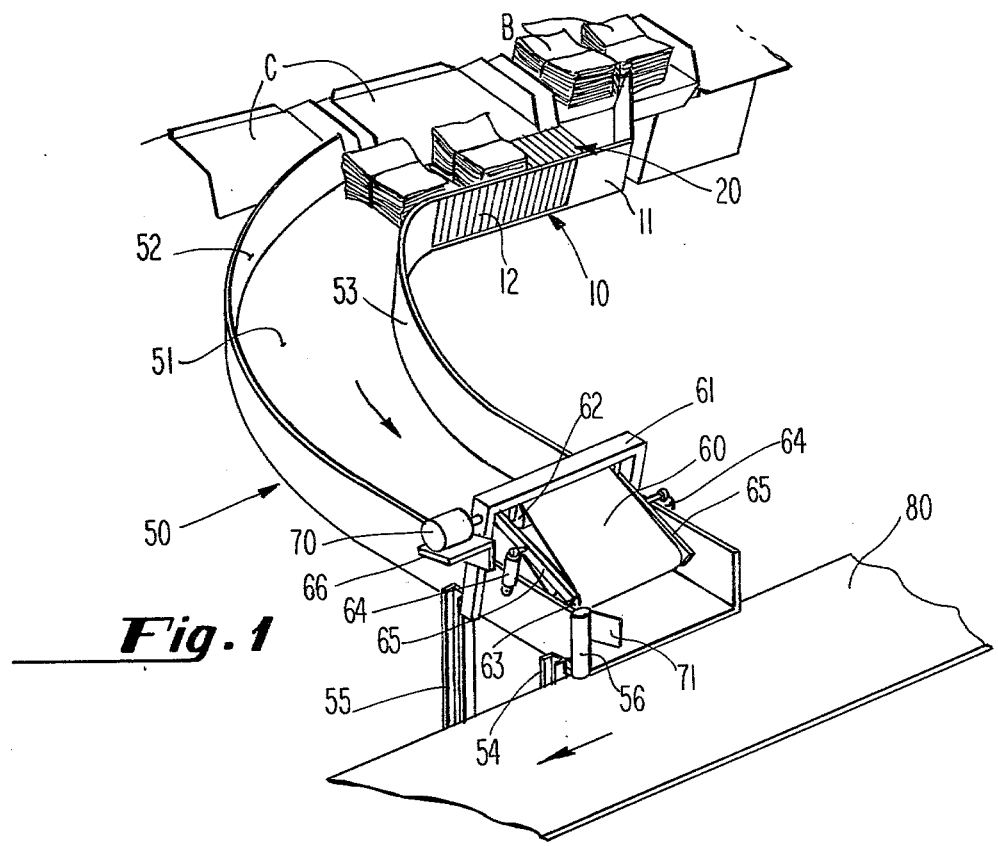
FIG. 1 is a schematic perspective view illustrating exit means provided in accordance with the present inventions.
Figure 2:
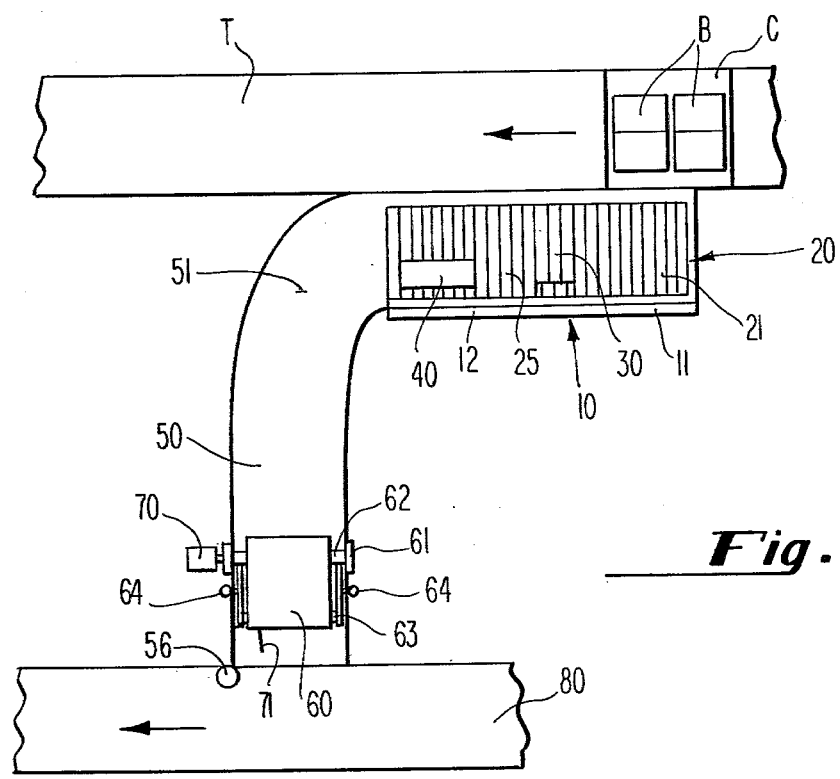
FIG. 2 is a schematic plan view of the exit means of FIG. 1.

Referring now to FIGS. 1 and 2, the exit system of the present invention is adapted to receive simultaneously two bundles B of a pair of newspapers bundles which had been positioned side-by-side in one of the carts C of an endless cart train traveling about a closed-loop track T. As previously described, the track T on which the carts C are traveling is tilted to an angle of 30° before the track reaches the exit station. When the cart on the tilted track reaches the exit station, a side gate of the cart is cam operated to open position and a pair of bundles of newspapers slide under the force of gravity off the cart onto the bundle-spacing section of an exit conveyor and slam up against the plate 11 of a generally upright spring-loaded backboard 10. The remainder of the backboard may preferably comprise a series of rollers 12 free to rotate on generally upright fixed axles to facilitate movement of bundles along the exit conveyor. The bundle-spacing section has a roller conveyor floor 20 which is tilted at an angular position of 25° from the horizontal. The spring-loaded backboard 10 and its rollers 12 are at right angles to the roller floor and are tilted 25° from the vertical. The plate 11 of the backboard initially stops the sliding movement of the newspaper bundles in the direction at right angles to the track and maintains the bundles in the same orientation in which they were carried on the cart of the cart train. On the cart train the longer-dimension edges of the newspapers are transverse to the axis of the track and parallel to the cross walls of the cart.

Figure 3:
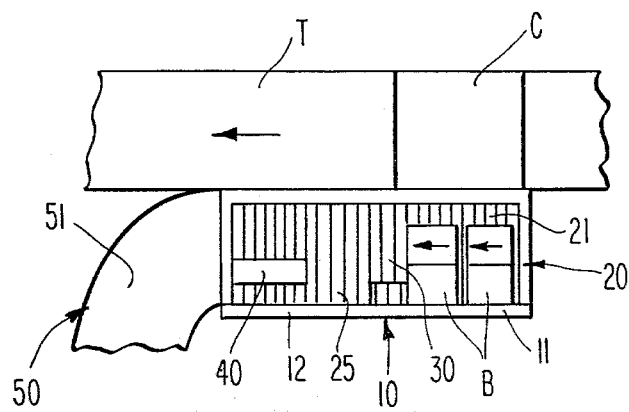
FIGS. 3–7 is a series of schematic plan views illustrating the movement of the bundles through the exit means.

The first portion of the floor of the bundle-spacing section of the exit conveyor consists of a series of driven steel rollers 21 each rotatable about its own fixed axis. These rollers 21 are frictionally driven by a powered drive belt 22 (FIGS. 8 and 9) located underneath the floor of rollers. On rollers 21, the bundles are moved along at approximately the same speed as that of the cart from which the newspaper bundles were ejected. FIG. 3 illustrates schematically a pair of bundles on rollers 21 in the first portion of the bundle-spacing section.

Following the first series of power driven floor rollers 21 is a slow-down section which may preferably comprise a short series of fricition-surface drag rollers 30. However, other means for introducing drag may be used. The purpose of the slow-down section is to introduce a selected amount of separation between succeeding bundles. The drag rollers 30 are preferably shortened in length to avoid being driven by a common belt 22 (FIGS. 8 and 9) which drives the rollers of the first and final portions 21 and 25. The drag rollers 30 may be braked by adjustable springs 31 (FIG. 8) to introduce a predetermined amount of resistance against being rotated by the newspaper bundles as they are pushed and/or pulled over the drag rollers.

Following the drag rollers 30 of the slow-down section is a final section of driven rollers 25 each frictionally driven to rotate on its individual fixed axis. This final section is preferably driven by the same drive belt 22 that drives the first section so that the rollers 21 and 25 on either side of the slowdown section 30 rotate at the same speed.

The slow-down section is effective to introduce a preselected amount of separation between succeeding bundles due to the following action.

When the leading part of a first bundle arrives at the drag rollers 30, its forward movement is slowed down. The next following bundle, having not yet reached the drag rollers, continues to move at the speed of the driven rollers 21. Thus, the next following bundle catches up to and bumps against the rear edge of the preceding bundle and pushes the preceding bundle forward over the drag rollers 30 of the slow-down section. As soon as the preceding bundle has cleared the drag rollers 30 it is carried forward by the driven rollers 25 of the final section. Thus, it separates from the next following bundle which is still in the slow-down section. The action just described is repeated as successive pairs of bundles pass through the bundle-spacing section, and desired spacings are obtained between succeeding bundles. The spacing is adjustable by adjusting the resistance on the drag rollers 30.

When a bundle has passed beyond the final section 25 of the bundle-spacing conveyor, it is engaged by and carried forward by a bundle-accelerating bundle-turning device whose purpose will become clear. The bundle-accelerating bundle-turning section may preferably be an off-center endless fricition belt 40 supported on non-driven steel rollers 41, or on a flat plate, or on other suitable supporting surface. Other means than an off-center belt may be used to turn the bundle. Belt 40 is driven at a speed substantially higher than that of the rollers 21, 25 of the bundle-spacing conveyor, as for example at 300 feet per minute, so as to increase the spacing between successive bundles and to throw or eject the bundles into the 90° bend 51 of a gravity exit chute 50. The off-center belt 40 also pulls the bottom edge of the bundle away from the backboard rollers 12 into an angular orientation. This illustrated schematically in FIG. 4.

Figure 4:
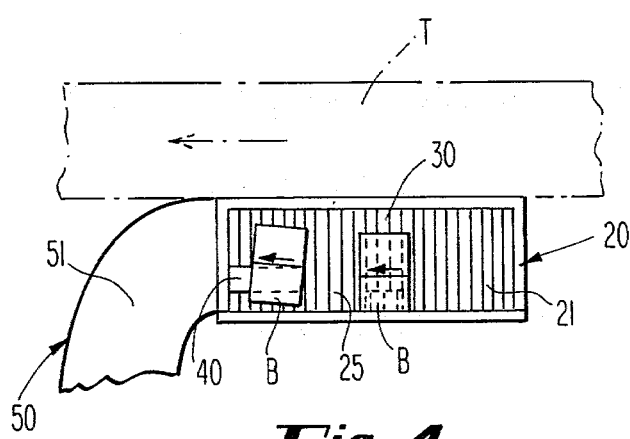

Off-center belt 40 is substantially narrower than the transverse dimension of the newspaper bundle. The belt may, for example, be 6" wide whereas the transverse dimension of a newspaper bundle may be of the order of 14". The belt is offset from the center of the conveyor toward the roller backstop 12. Thus, only that portion of the undersurface of the newspaper bundle which is closer to the backboard 12 is engaged and carried by the belt. In view of the 25° tilt of the floor, this portion of the bundle is identified herein as the lower portion of the bundle. Since the high-speed off-center conveyor belt 40 engages and carries only the lower portion of the bundle, the upper portion lags behind, and the bundle is subjected to a rotating force which angulates the bundle clockwise about its vertical axis, as illustrated in FIG. 4. As a result, the bundle is in an angular orientation as it enters the 90° turn 51 of the gravity exit chute 50.

Figure 5:
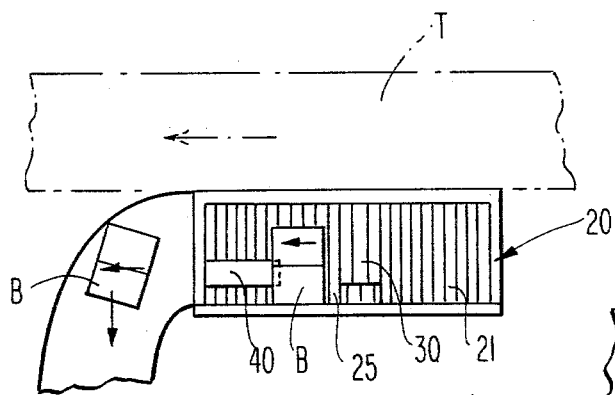
Figure 6:
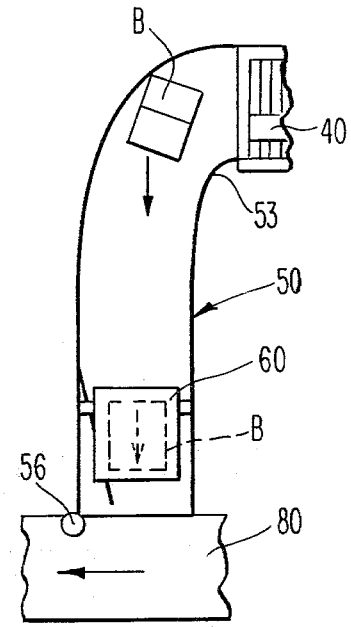

The action just described is illustrated schematically in FIGS. 4 and 5. The bottom portion of the bundle swings out and up into the bend 51 of the chute. The top forward corner of the bundle may hit the curved wall of the 90° bend, or, if the bundle is ejected by the belt 40 into the 90° bend at maximum velocity, both the top and the lower forward corners of the bundle may strike the large-radius outer wall 52 of the bend of the chute. This slows the bundle down, and the bundle, narrow bottom edge leading, slides by gravity down the chute with the long dimension edge of the bundle parallel with the axis of the chute 50.

In the absence of a bundle-accelerating bundle-turning device, such as off-center belt 40, the lower edge of the bundle will bear against the upright roller backstop 12 as it travels toward the 90° bend 51 and when the bundle leaves the roller backstop 12 the lower edge of the bundle will tend to stay against the surface of the small-radius wall 53 of the 90° bend and be slowed down by frictional resistance to such an extent that the bundle will rotate counterclockwise and fall down the chute with the forward long-dimension edge of the bundle leading the way. This is not desired and is avoided by the bundle-accelerating bundle-turning means provided by the present invention.

As seen in FIGS. 1 and 2, at the bottom of the gravity chute 50 is a cross belt conveyor 80 which is moving parallel to the cart track T and at right angles to the axis of the gravity chute 50. On cross belt 80, the bundle is to be deposited in a particular position. To achieve this position, the speed of the bundle at the base of the gravity chute 50 must be so controlled that the bundle enters the cross belt conveyor 80 at a speed slower than that of the cross belt conveyor.

Control of bundle speed is accomplished, in accordance with the present invention, by causing the bundle to be engaged by an overhead powered fricition-surfaced endless belt 60 mounted pivotally above the surface of the gravity chute 50. The pivotal end 62 of belt 60 is mounted in an elevated position sufficient to provide a vertical opening greater than the maximum height of a newspaper bundle. The elevational position of the down-stream or floating end 63 of the pivotal belt 60 is required to be close enough to the surface of the chute to be engaged by the bundles. This position is controlled by a pair of shock absorbers 64, one on each side of the belt 60. The shock absorbers 64 support a pair of arms 65 which support the endless belt 60. The bottom of the shock absorbers 64 provides the stop which determines how high the floating lower end 63 of the pivotal belt 60 is set above the surface of the chute 50. As an approaching bundle slides into the vertical throat, it contacts the sloping wall of belt 60. The contacted belt 60 is moving in the same direction as the bundle and at a desired exit speed. The bundle is slowed down by the flexing belt wall and as the bundle is drawn forward by the moving belt 60, the bundle lifts the pivot arms 65 against the resistance of the shock absorbers 64 and the bundle exits at a desired speed controlled by the speed of the powered belt 60. The support arms 65 and belt 60 then drop back down controlled by the shock absorbers 64 until the lower end 63 again rests at its lower limit position above the surface of chute 50.

Having described the operation of the exit system generally, the structure of the preferred form of exit roller conveyor having a bundle-spacing section and a bundle-turning section will now be described with particular reference to FIGS. 8 and 9. The structure of the preferred form of bundle-speed control device provided at the foot of the gravity exit chute 50 will also be described with particular reference to FIGS. 10 and 11.

Referring now to FIGS. 8 and 9, a motor 30' drives a shaft on which is mounted a sprocket 31' about which is trained a chain 32 which drives a sprocket 33 fixed to and mounted on a cross shaft 34. Also fixed on cross shaft 34 is a sprocket 35 which drives a chain 36 which drives a sprocket 37 fixed to and mounted on a cross shaft 38. Sprocket 37 has a smaller diameter than sprocket 35 and accordingly shaft 38 is driven rotationally at a higher speed than is the drive shaft 34. Fixed on the driven cross shaft 38 is a pulley 39 which drives an endless flexible friction belt 40. The upper surface of belt 40 is shown to be supported by a series of non-driven roller members 41 but belt 40 could be supported on a flat frictionless plate. The belt 40 has a width substantially smaller than the width of the roller conveyor and is positioned to one side of the center of the conveyor, specifically, to that side of the conveyor which is closer to the spring-loaded shock-absorbing backstop 10.

Also fixed on drive shaft 34 is a pulley 24 which drives an endless belt 22. Belt 22 is trained over a series of rollers 26 positioned just beneath the steel rollers 21 and 25 of the roller conveyor. By means of eye bolts or other suitable means not illustrated, the rollers 26 are loaded upwardly so that the drive belt 22 is pressed fricitionally against the undersurfaces of the rollers 21 and 25. The drag rollers 30 are made of shortened length so as to escape engagement by the drive belt 22.

As has already been indicated, drag rollers 30, which have a friction surface, are made sufficiently short to escape engagement by the drive belt 22. Each of the drag rollers 30 (three are shown) is adjusted to resist rotation. The compression springs 31 are adjusted to bear against one end of the drag rollers 30 to impose a desired amount of resistance against the friction-surfaced rollers being rotated by the newspaper bundles as they pass through the slow-down section.

It will be understood from the foregoing description that the two sets of floor rollers 21 and 25 are preferably driven at the same rotational speed by a common drive belt 22 and that the amount of drag imposed on the undersurface of the bundles by the friction-surfaced drag rollers 30 may be regulated and controlled by adjusting the thrust of the compression springs 31 against the ends of the drag rollers. It will also be understood that the off-center endless belt 40 is driven at a faster rate than are the rollers 21 and 25 so that as the bundles are engaged by the off-center belt 40, they are advanced at an accelerated rate. Because the belt 40 is positioned to the lower side of center, the bundles are also caused to rotate clockwise (as viewed from above).

Figure 10:
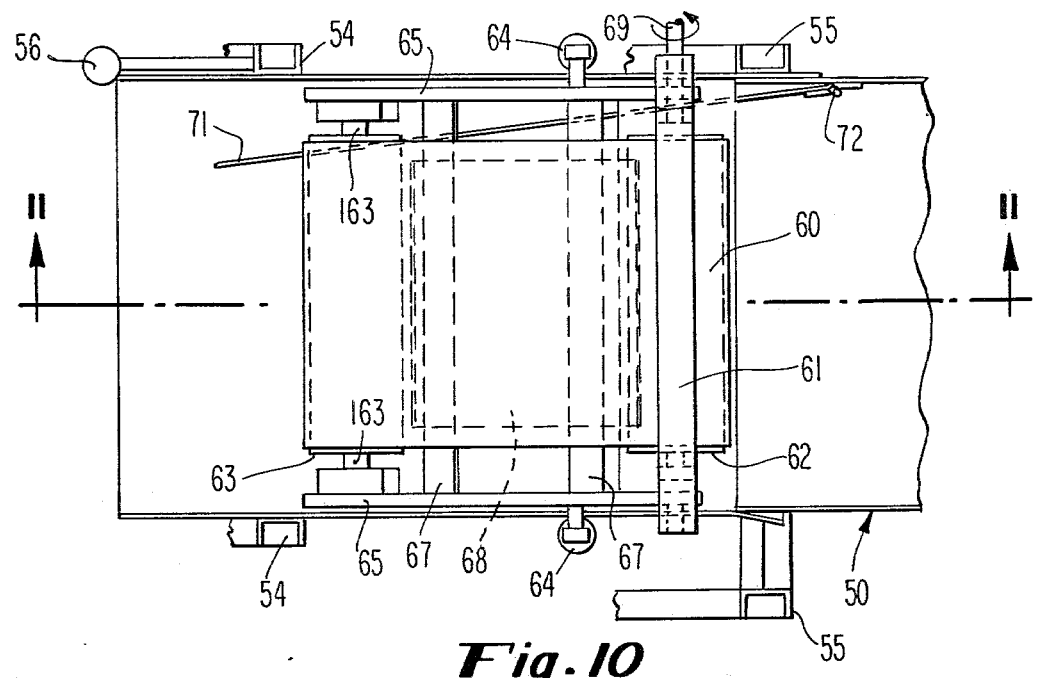
FIG. 10 is a top plan view of the bundle speed-control equipment at the base of the exit chute.
Figure 11:
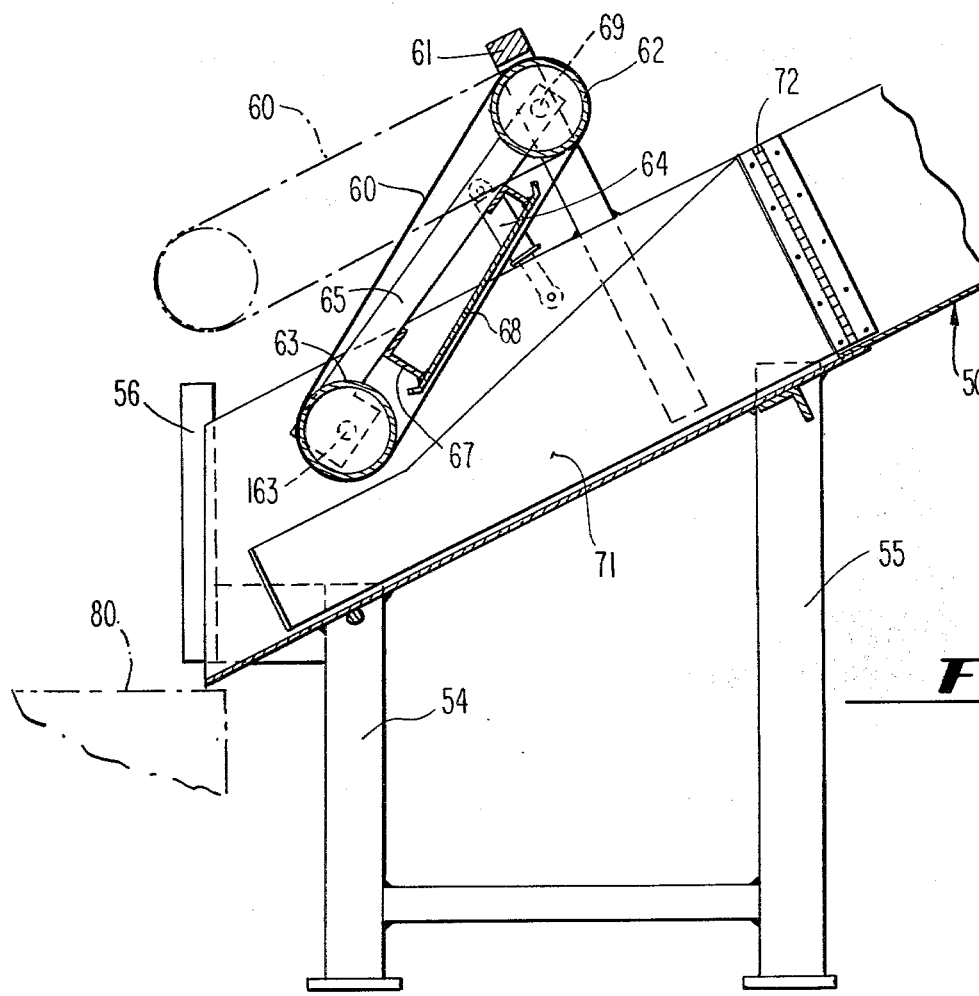
FIG. 11 is a side elevational view of the bundle speed-control equipment looking along the line 11—11 of FIG. 10.

Referring now to FIGS. 10 and 11, the bundle space-control device provided at the foot of the gravity exit chute 50 comprises an endless flexible friction belt 60 driven by a pulley 62 fixed on a shaft 69 powered by any suitable means. In FIGS. 1 and 2 of the drawing, the drive shaft 69 is illustrated as being driven by a motor 70 supported on a bracket 66 which is fastened to a leg of an inverted U-shaped support frame 61.

The legs of frame member 61 are fastened to and supported by the gravity chute 50 which is illustrated as being supported on the legs 54 and 55. Pivotally supported as by bearings on drive shaft 69 is a pair of cantilever arms 65, one on each side of the endless belt 60. Arms 65 extend forwardly from the pivot shaft 69 in the direction of movement of the bundles which are sliding down the chute 50. Supported in bearings at the free forward ends of the arms 65 is a shaft 163 on which a pulley 63 is rotatable. The forward end of the flexible endless belt 60 is trained around the pulley 63.

Secured to the under surface of the pair of forwardly-extending cantilever arms 65 are two cross angle irons 67 which support a flat rectangular plate 68. The under reach of endless belt 60 travels along the undersurface of plate 68. A side guide member 71 hinged at 72 and spring-loaded away from the sidewall of the chute 50 and toward the center axis of the chute, serves to guide the bundles as they pass through the speed control device and keeps the bundles away from the sidewall of the chute.

The forwardly-extending arms 65 are supported toward their rearward ends by a pair of shock absorbers 64. The upper ends of the shock absorbers are connected to the arms 65; the lower ends are connected to the sidewalls of the chute 55. The lower limit position of the forward free end of the endless belt 60 is controlled by the bottom of the shock absorbers 64.

Figure 7:
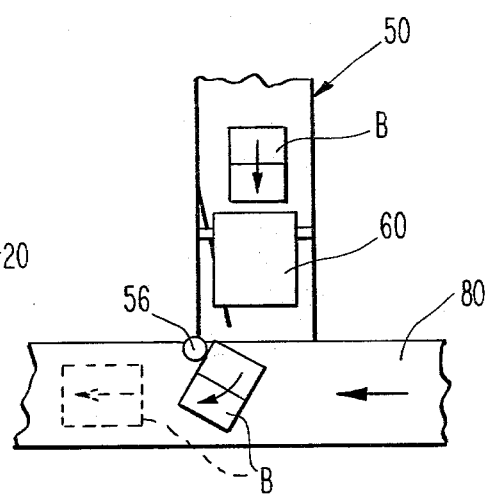

It will be understood that as a bundle slides down the exit chute 50, it encounters the lower free end of the power driven pivotal flexible belt 60 and pushes the belt up against the undersurface of the plate 68 causing the arms 65 to pivot upwardly in counterclockwise direction from the solid-line position to the phantom position shown in FIG. 11. This upward pivotal movement is opposed and restrained by the action of the shock absorbers 64 and the lower reach of the powered endless belt 60 remains in contact with the upper surface of the bundle. As a result, the bundle is moved forwardly toward the cross conveyor 80 at a speed which is controlled by the speed of travel of the power driven belt 60. The speed at which the bundle is moved forwardly toward the cross conveyor 80 is selected to be less than the speed at which the cross conveyor 80 is moving. As a result, as the bundle enters the cross conveyor 80 it is carried toward and engages the pivot post 56 and is caused to turn on its own axis in the manner indicated schematically in FIG. 7. This places the bundle in the desired orientation on the conveyor 80 as shown in phantom in FIG. 7. In this orientation, the longer sides of the bundle are parallel with the axis of conveyor 80, and in this orientation the bundles are carried to the loading docks.

While presently preferred structures have been illustrated and described, the scope of the invention(s) is of course defined in the claims which are appended hereto.

What is claimed is:

1. In a newspaper mail room system in which bundles of newspapers are carried in carts on a cart track with the long dimension of the newspaper bundle transverse to the cart axis and in which bundles are slid from the carts by gravitational forces onto an exit conveyor system, said exit conveyor system including:
   a. roller conveyor means having backstop means against which the cart-ejected bundles slide, said back-stop means maintaining the bundles in the same orientation in which they were carried by the carts,
   b. said roller conveyor means including drag means intermediate its input and output ends for introducing spaced separation between bundles;
   c. narrow-belt off-center conveyor means engaging only the lower portion of the bundles for rotating the bundles to an angular orientation for entry into the 90° bend of a gravity chute;
   d. a gravity exit chute having a 90° entrance bend for receiving said angularly oriented bundles and sliding said bundles in nonangular orientation down the gravity chute;
   e. a cross belt conveyor at the base of said gravity exit chute;
   f. bundle-speed control means at the base of said gravity chute through which said bundles pass, said bundle-speed control means including an overhead belt for delivering said bundles to said cross-conveyor at a bundle speed less than said cross-conveyor speed.

2. An exit conveyor system for handling bundles of newspapers in a newspaper mail room, said system including a bundle-spacing section comprising:
   (a) a first series of power-driven rollers on which said bundles are received and conveyed;
   (b) a final series of power-driven rollers for receiving and advancing bundles conveyed through said first series;
   (c) means defining a common friction drive belt for rotationally driving said first and final series of rollers;
   (d) a slow-down section intermediate said first and final series of rollers having;
      (i) retardation means defining roller members with resistance means for resisting rotation thereof;
   (e) a bundle turning section operatively associated with said final series of rollers defining an off-center endless belt having a width not greater than one half of the long dimension of a newspaper in the bundle including:
      (i) driving means for advancing said bundles at a speed greater than that provided by said final series of rollers to effect angular rotation thereof.

3. Apparatus according to claim 2 wherein the means for driving said off-center belt of said bundle-turning section includes common means driving said friction drive belt of said bundle-spacing section.

4. Apparatus according to claim 3 wherein said common means for driving said off-center belt includes speed step-up means.

5. Apparatus according to claim 4 wherein said speed step-up means comprises a chain and sprocket drive.

* * * * *